United States Patent [19]

Tsukada

[11] Patent Number: 5,517,273
[45] Date of Patent: May 14, 1996

[54] DEVICE FOR DETERMINING WHETHER FOCUS DETECTION MAY BE ACCURATELY PERFORMED USING CHARACTERISTIC DATA OF AN INTERCHANGEABLE LENS AND FOCUS DETECTION DEVICE

[75] Inventor: Shinichi Tsukada, Toride, Japan

[73] Assignee: Nikon Corporation, Tokyo, Japan

[21] Appl. No.: 145,833

[22] Filed: Nov. 4, 1993

[30] Foreign Application Priority Data

Nov. 4, 1992 [JP] Japan .................................. 4-319360

[51] Int. Cl.$^6$ ................................................ G03B 13/36
[52] U.S. Cl. ............................................................ 354/402
[58] Field of Search ..................................... 354/402, 406, 354/407, 408

[56] References Cited

U.S. PATENT DOCUMENTS

| | | | |
|---|---|---|---|
| 4,816,663 | 3/1989 | Utagawa et al. | 354/402 X |
| 4,857,720 | 8/1989 | Karasaki | 354/408 X |
| 4,903,065 | 2/1990 | Taniguchi et al. | 354/402 |
| 5,003,336 | 3/1991 | Karasaki et al. | 354/402 X |

FOREIGN PATENT DOCUMENTS

| | | |
|---|---|---|
| 63-284526 | 11/1988 | Japan . |
| 63-286830 | 11/1988 | Japan . |
| 1-221712 | 9/1989 | Japan . |
| 1-289905 | 11/1989 | Japan . |
| 1-289906 | 11/1989 | Japan . |

Primary Examiner—Michael L. Gellner
Assistant Examiner—J. K. Han

[57] ABSTRACT

A camera having focus detection capability which decides whether or not focus detection is possible. The camera is capable of accommodating interchangeable lenses, and determines whether focus detection is possible for an optional combination of interchangeable lens and camera based upon characteristic data for the interchangeable lens and characteristic data for a focus detection device. The characteristic data for the interchangeable lens is data representing an exit beam for an optional image height which is stored in a lens memory. The data representing the exit beam may be the position and size of plural circular apertures for the interchangeable lens. The characteristic data for the focus detection device is stored in a camera body memory and represents a position and shape of a rangefinder image point. When focus detection is possible, a photographic lens is driven according to the focus detection result.

19 Claims, 9 Drawing Sheets

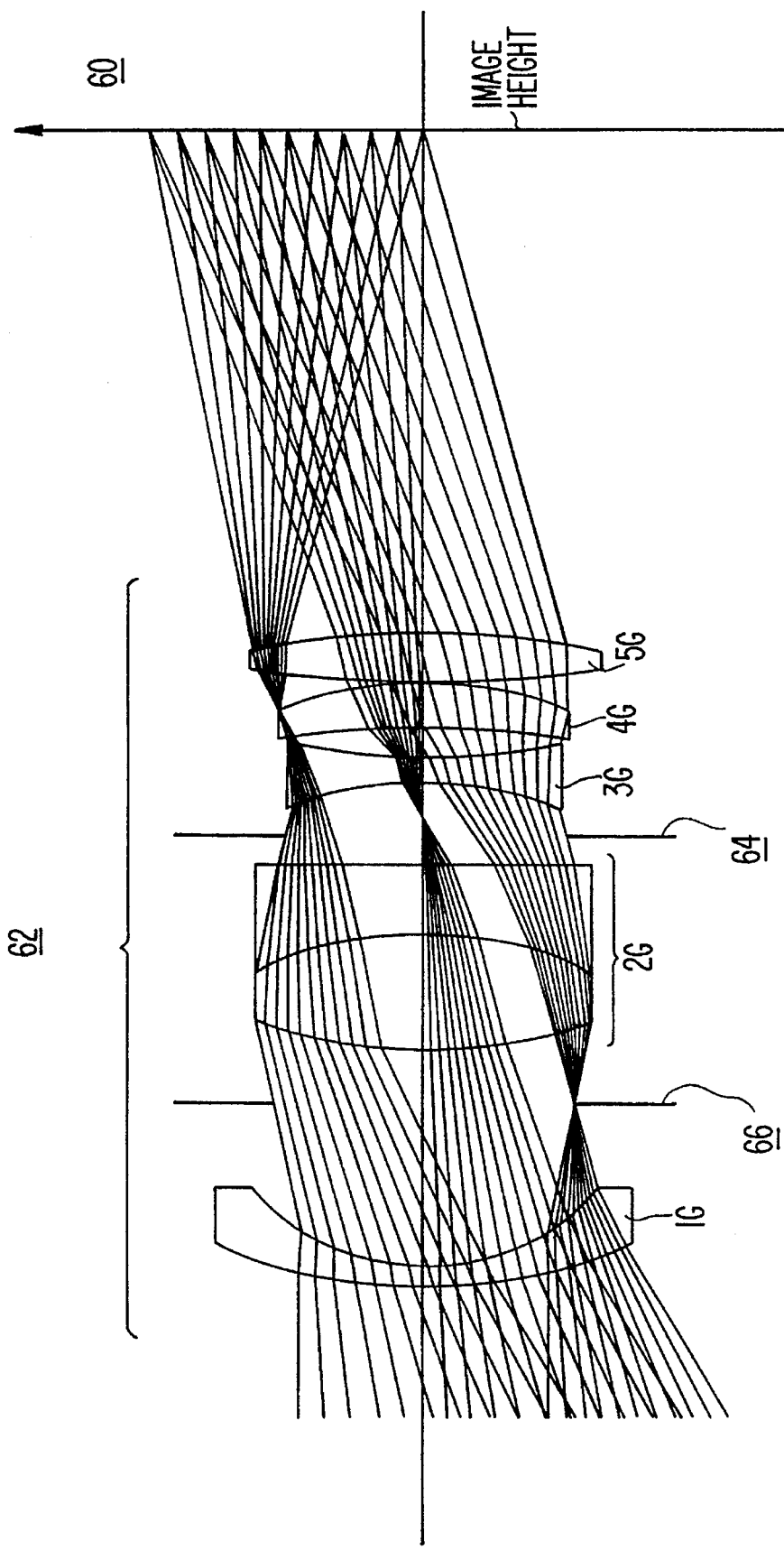

DEVICE FOR DETERMINING WHETHER FOCUS DETECTION MAY BE ACCURATELY PERFORMED USING CHARACTERISTIC DATA OF AN INTERCHANGEABLE LENS AND FOCUS DETECTION DEVICE

BACKGROUND OF THE INVENTION

1. Field of the Invention

The present invention relates to a camera which is capable of accommodating interchangeable lenses and which has focus detection capability. More specifically, the present invention relates to a camera which decides whether or not focus detection is possible based upon characteristic data for an interchangeable lens mounted on the camera and upon characteristic data for an automatic focus device located in the camera.

2. Description of the Related Art

Cameras which can accommodate interchangeable lenses and which have focus detection capability are known. For example, Japanese Laid-Open Patent Publication No. 63-284526 ("JP-A-63-284526") discloses a camera wherein data representing an exit pupil of an interchangeable lens (i.e., the stop aperture of the interchangeable lens) is stored in the interchangeable lens and is used to decide whether or not focus detection is possible. However, the exit beam through the interchangeable lens happens to be limited by the placement of the edge of a lens block (e.g., the lens block may be placed in front of or behind the stop aperture). Therefore, the exit beam generally cannot be determined at the exit pupil (stop aperture).

The above-described phenomenon is referred to as "vignetting", and the phenomenon becomes evident when the image height increases. It is well known to limit the vignetting phenomenon of the exit beam by using an aperture outside the stop aperture, with the result that when image height increases, the amount of exit light becomes small. In known cameras, information concerning the exit beam was considered necessary for the cameras with focusing capability. However, as described above, if the exit pupil stop aperture does not completely determine the exit beam, the information relating to the exit pupil is insufficient to determine whether or not focus detection is possible.

According to JP-A-63-284526, an image height correction quantity is stored. However, the image height correction quantity is for the situation in which there is no vignetting. Because the exit pupil is seen obliquely when the image height increases, the exit pupil becomes flattened, and the amount of its correction does not correctly represent the exit beam.

SUMMARY OF THE INVENTION

It is therefore an object of the present invention to provide a camera having focus detection capability and which can accurately determine whether focus detection is possible.

It is a further object of the present invention to provide a camera which is capable of accommodating interchangeable lenses and which determines whether focus detection is possible for an optional combination of interchangeable lens and camera body.

It is a further object of the present invention to provide a camera which is capable of accommodating interchangeable lenses and which decides whether focus detection is possible based upon characteristic data for the interchangeable lens.

It is yet a further object of the present invention to provide a camera which is capable of accommodating interchangeable lenses and which decides whether focus detection is possible based upon data representing an exit beam for an optional image height which is stored in a lens memory, and based upon data stored in a camera body memory which represents the type of focus detection device used.

Additional objects and advantages of the invention will be set forth in part in the description which follows, and, in part, will be obvious from the description, and may be learned by practice of the invention.

The above objects are achieved by providing a camera which includes an interchangeable lens which is mounted on the camera, and at least one focus detection device located in the camera which performs focus detection for a detection region in a photographic image plane, and which outputs a focus position. A lens memory built into the interchangeable lens stores data representing an exit beam for optional image heights, which data may be the position and size of plural circular apertures for the interchangeable lens. A camera body memory stores data representing the size and shape of a range-finding pupil for the at least one focus detection device, and also stores data representing the range-finding image point. A decision unit determines whether focus detection is possible based upon the data stored in the lens memory and the data stored in the camera body memory, and a control unit controls focusing of the camera based upon the determination of the decision unit.

BRIEF DESCRIPTION OF THE DRAWINGS

These and other objects and advantages of the invention will become apparent and more readily appreciated from the following description of the preferred embodiments taken in conjunction with the accompanying drawings, of which:

FIG. 7 is a cross-sectional view of the light paths of imaging beams in a wide angle lens in accordance with the preferred embodiments of the present invention.

DESCRIPTION OF THE PREFERRED EMBODIMENTS

Figure 1:
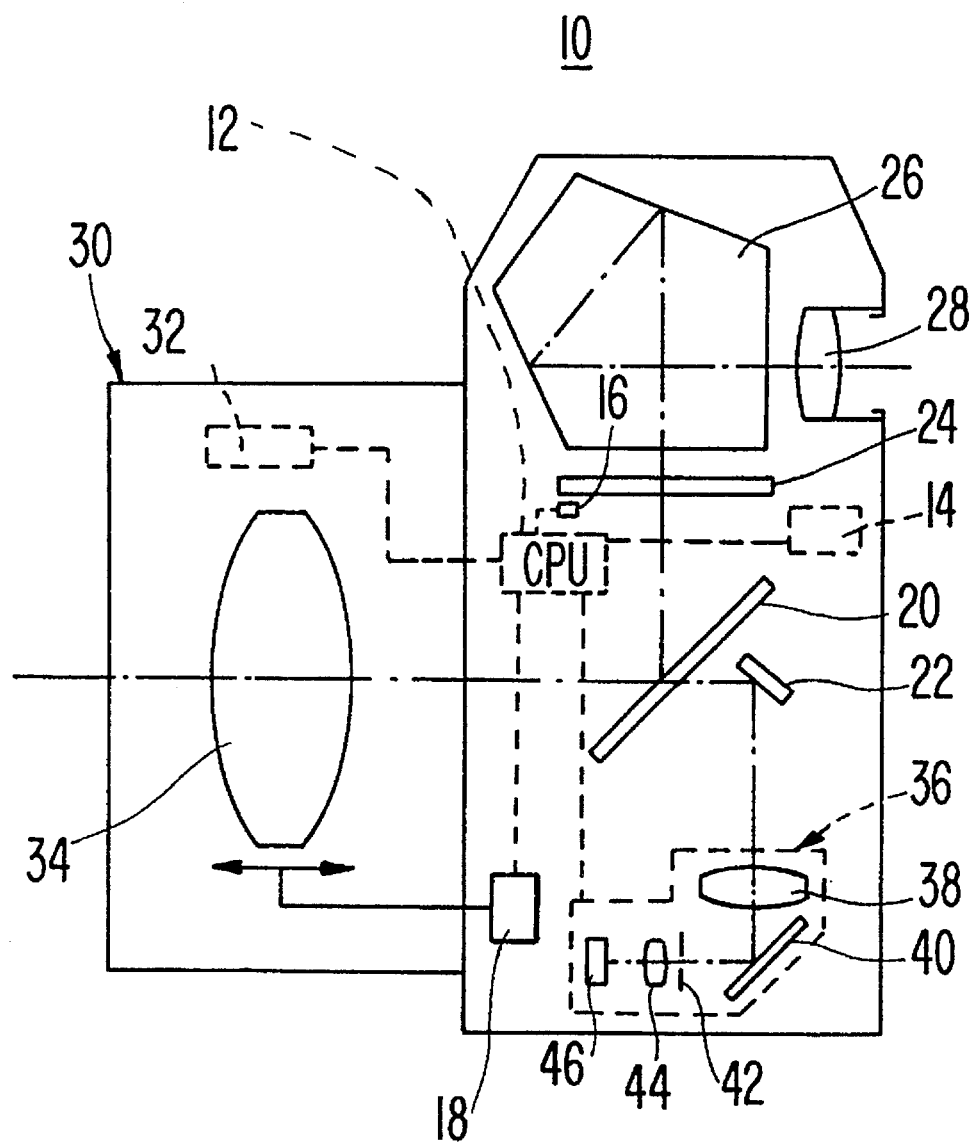
FIG. 1 is a side view of a camera having an interchangeable lens and focus detection capability in accordance with the preferred embodiments of the present invention.

Reference will now be made in detail to the present preferred embodiments of the present invention, examples of which are illustrated in the accompanying drawings. Like reference numerals refer to like elements throughout.

FIG. 1 is a side view of a camera equipped with an interchangeable lens and which is capable of performing focus detection in accordance with the preferred embodiments of the present invention. As seen in FIG. 1, an interchangeable lens 30 is installed, freely demountable, on a camera body 10. The interchangeable lens 30 includes a photographic lens 34. Light from a photographic subject enters the interchangeable lens 30 and passes through the photographic lens 34. A portion of the light which has passed through photographic lens 30 then passes through a transmitting portion of a movable mirror 20 built into the camera body 10, and is reflected downward by an auxiliary mirror 22 which is fixed in relation to the movable mirror 20. The portion of the light which is reflected downward by auxiliary mirror 22 enters a focus detection device 36. The focus detection device 36 includes a condenser lens 38, a mirror 40, a stop mask 42, a re-imaging lens 44, and a light receiving element 46, which will be described in greater detail below with respect to FIG. 4.

A portion of the light reflected from the photographic subject which has passed through photographic lens 34 is reflected by movable mirror 20, and passes through a focusing plate (viewfinder screen) 24. The light is then reflected through a pentaprism 26, and, after being reflected through the pentaprism 26, the light passes to a photographer's eye through an eyepiece lens 28.

Interchangeable lens 30 includes a lens memory 32 which stores data indicating characteristics of the interchangeable lens 30. The lens memory 32 is connected to a CPU 12 located in the camera body 10. The CPU 12 performs control of the camera operations. A camera body memory 14 located in the camera body 10 stores data indicating characteristics of the focus detection device 36. The camera body memory 14 is also connected to the CPU 12. The CPU 12 receives signals from the lens memory 32 and from the camera body memory 14, and, based upon these signals decides whether or not focus detection is possible. When focus detection is possible, detection device 36 is operated and generates a drive signal for focus adjustment according to the result of the focus detection. The drive signal for focus adjustment is transmitted to a lens drive device 18 to drive the photographic lens 34. When focus detection is impossible, a display to this effect is provided on display device 16.

Applicant has determined that the exit beam for an interchangeable lens which has an optional image height and which has rotational symmetry about its optical axis can be represented using plural circular apertures with the optical axis as their center. The image height is defined as the distance from the photographic optical axis to an image point within a photographic image surface. Furthermore, in general, an interchangeable lens has rotational symmetry relative to the photographic optical axis, and the imaging capacity of the interchangeable lens is equal at image points having the same image height.

Data representing an exit beam for an interchangeable lens 30 having an optional image height is stored in the lens memory 32 as the characteristic data of the interchangeable lens 30. The position and shape of a rangefinder pupil, and data representing the rangefinder image point are stored in the camera body memory 14 as characteristic data of the focus detection device 36. For a particular interchangeable lens 30, when suitable plural circular apertures have been selected, a group of light rays passing through each of the plural circular apertures and intersecting at some optional image point on an image plane agrees with the exit beam of the interchangeable lens 30 in its image point.

Figure 2:
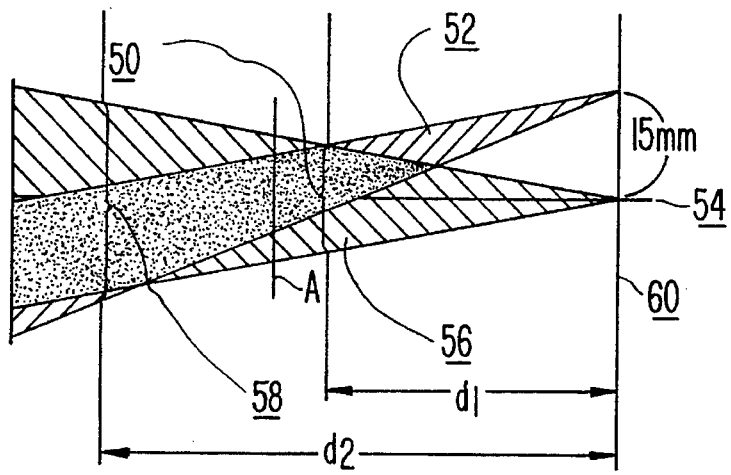
FIG. 2 is a cross-sectional view of plural circular apertures and exit beams in accordance with the preferred embodiments of the present invention.

FIG. 2 is a cross-sectional view showing plural circular apertures and exit beams for an interchangeable lens. As seen in FIG. 2, circular aperture 1 has a radius $R_1$ and circular aperture 2 has a radius $R_2$. Circular aperture 1 (50) is located at a distance $d_1$ from the image plane 60. Circular aperture 2 (58) is located at a distance $d_2$ from the image plane 60. Further, as seen in FIG. 2, an exit beam 56 having an image height of 0 mm, and an exit beam 52 having an image height of 15 mm are shown. The number of circular apertures may differ according to the type of interchangeable lens. However, based upon the results observed in an interchangeable lens with many apertures, it is understood that, although two circular apertures are shown in FIG. 2, the number of circular apertures may vary. For example, four circular apertures is a sufficient number.

Figure 3A:
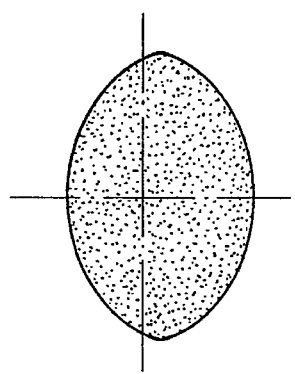
FIGS. 3A and 3B are cross-sectional views showing the superposition of an actual exit beam and an exit beam determined from plural circular apertures in an interchangeable lens in accordance with the preferred embodiments of the present invention.

FIG. 3A is a cross-sectional view of an exit beam of 15 mm image height corresponding to the surface shown by a dotted line A in FIG. 2. FIG. 3A also shows a cross-sectional view of an exit beam determined by the two circular apertures 50 and 58 in FIG. 2 superposed (portion of the figure drawn in fine dots).

Figure 3B:
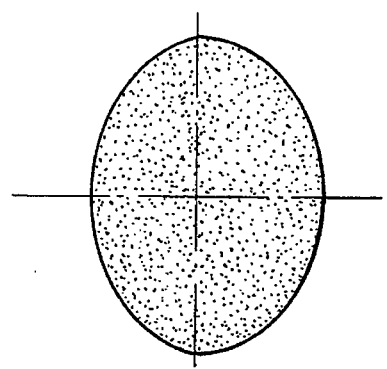

FIG. 3B shows the same view as FIG. 3A, except the image height is only 10 mm. In both FIG. 3A and FIG. 3B, the actual exit beam and the exit beam determined by circular aperture 1 (50, FIG. 2), and circular aperture 2 (58, FIG. 2) are in agreement.

Two parameters are sufficient to represent the two circular apertures 50 and 58 because they are centered on the optical axis. Specifically, the distance $d_i$ of the aperture from the image plane, and the radius $r_i$ of the aperture may be used to represent the apertures. Accordingly, in the case of an interchangeable lens 30 with two apertures, a total of four variables, $d_1$, $d_2$, $r_1$, and $r_2$, are stored in the lens memory 32.

As described above, the number of circular apertures which are necessary varies according to the type of interchangeable lens. Therefore, in general, the interchangeable lens data which is stored is (1) the number n of circular apertures, (2) the distance $d_i$ where i=1~n, and (3) the radius ri where i=1~n, or a total of (2n+1) pieces of data. Alternatively, the values $F_i$ equal to the F number, where $F_i=d_i/r_i$, may be stored instead of the values of $r_i$.

Figure 4:
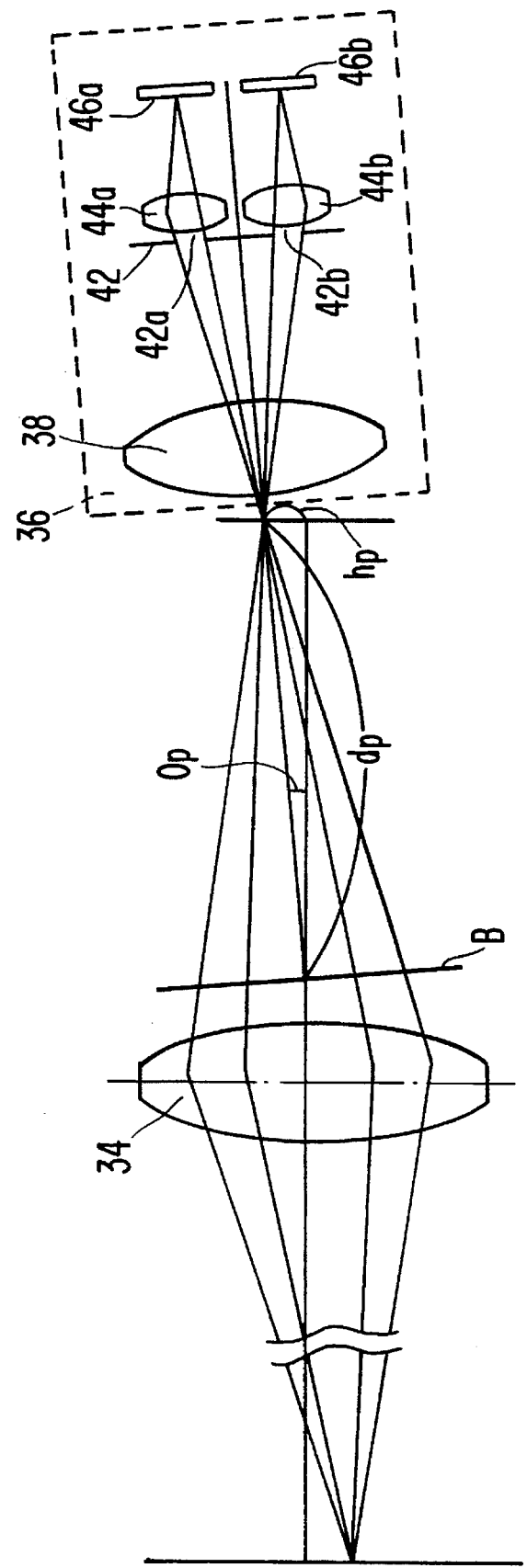
FIG. 4 is a schematic view of an example of a focus detection device which may be used in a camera in accordance with the preferred embodiments of the present invention.

Referring now to FIG. 4, an example of a focus detection device 36 which may be used in a camera in accordance with the preferred embodiments of the present invention will be described. The focus detection device 36 may be a commonly used phase difference type focus detection device. The focus detection device 36 is known as a phase difference type because two partial beams are extracted from the exit beam from the photographic lens 34 and the focused state is detected based upon the difference in the imaging positions of the respective partial beams. In operation, the exit beam of a photographic lens 34 is focused on a condenser lens 38 which directs the exit beam to a stop mask 42 having detection apertures 42a and 42b. The light directed through the apertures 42a and 42b is focused by re-imaging lenses 44a and 44b, respectively, onto light receiving elements 46a and 46b. The light receiving elements 46a and 46b include one-dimensionally arrayed imaging planes of minute photoelectric elements (CCDs, etc.) which detect the distribution of light intensity in order to determine the difference of the imaging positions. The direction of the arrays 46a and 46b and the row direction of the two detection apertures 42a and 42b are in agreement.

Figure 5:
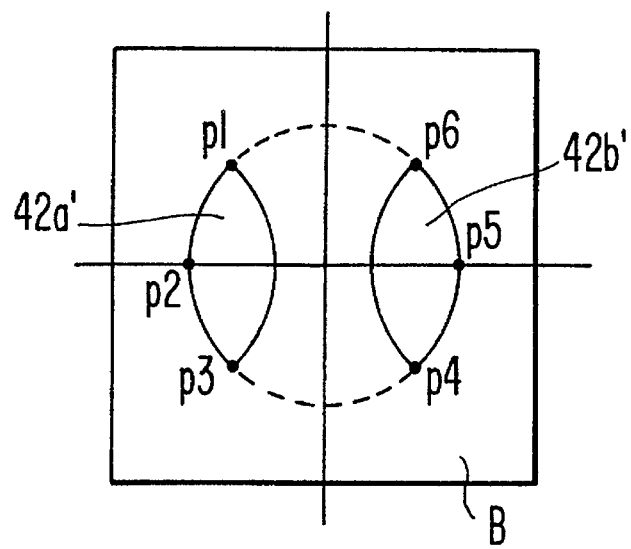
FIG. 5 illustrates a rangefinder pupil in the focus detection device of FIG. 4 in accordance with the preferred embodiments of the present invention.

FIG. 5 illustrates a rangefinder pupil in the focus detection device of FIG. 4. Images due to the condenser lens 38 of the detection apertures 42a and 42b on the stop mask 42 shown in FIG. 4, for example, are shown as rangefinder pupils 42a" and 42b'. The rangefinder pupils 42a' and 42b' are shown on the rangefinder pupil plane B shown in FIG. 4.

The shapes of rangefinder pupils 42a' and 42b' may be diverse, and the rangefinder pupils shown in FIG. 5 are of a representative shape. If the position and shape of the rangefinder pupil is known, and if the position coordinates of the six points $p_1$, $p_2$, $p_3$, $p_4$, $p_5$ and $P_6$ shown in FIG. 5 are known, this information is sufficient to use in deciding whether or not focus detection is possible.

In the camera according to the preferred embodiments of the present invention, when a focus detection device 36 is used, the position coordinates of the six points $p_1$, $p_2$, $p_3$, $p_4$, $p_5$ and $p_6$ arid the position coordinates of the rangefinder image point $p_0$ are stored in the camera body memory 14. The method of selecting the position coordinates is optional. For example, the optical axis of the interchangeable lens 30 may be the Z axis, and the image plane may be used as the X-Y plane, and, accordingly, the origin is in the image plane.

When the interchangeable lens 30 is mounted on the camera body 10, the determination as to whether or not focus detection is possible, for the rangefinder image point $p_0$ of interchangeable lens 30, is made by determining whether or not the exit beam covers the rangefinder pupils 42a', 42b' of the focus detection device 36. When the exit beam does not cover the rangefinder pupils 42a' and 42b', the vignetting phenomenon arises, and an erroneous distance is detected during focus detection.

Figure 6A:
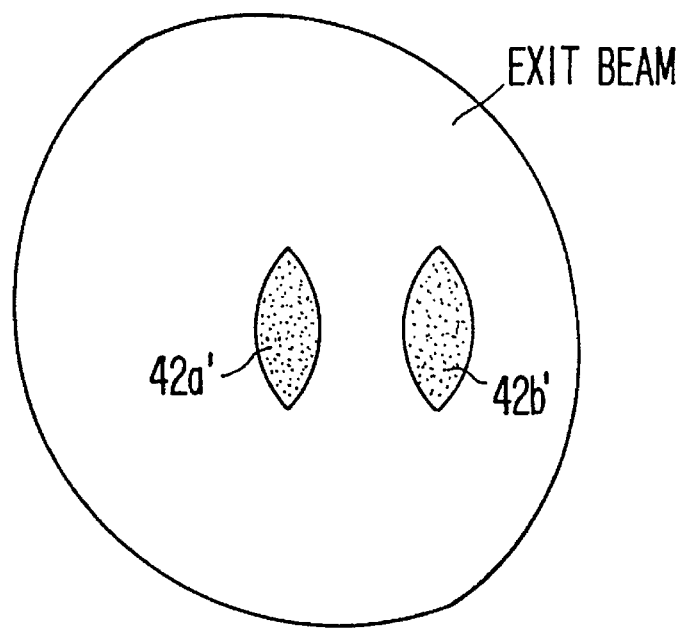
FIGS. 6A and 6B are diagrams illustrating the vignetting phenomenon.
Figure 6B:
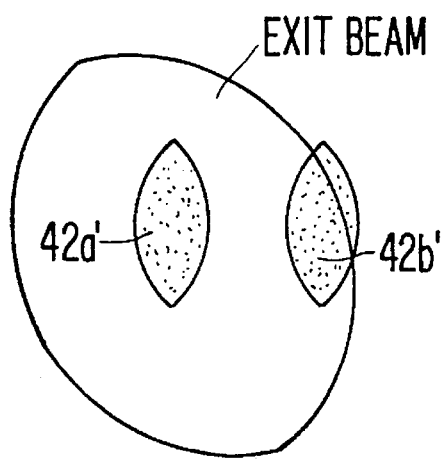

FIG. 6A shows a state when the exit beam covers the rangefinder pupils 42a' and 42b'. FIG. 6B shows a state when the exit beam does not cover the rangefinder pupils 42a' and 42b'.

The CPU 12 (FIG. 1) includes a built-in computing device which determines whether or not the exit beam covers the rangefinder pupils. This determination is performed as described below. The data representing the circular apertures of the interchangeable lens 30 are: (1) the number n of apertures, (2) the distance $d_i$ of the aperture, where i=1~n, from the image plane, and (3) the radius $r_i$, where i=1~n, of each aperture. Using the above data, an equation is calculated which represents a straight line joining the rangefinder image point $p_0$ and point $p_1$ representing the rangefinder pupils. Next, the respective intersection points of the calculated straight line and the planes representing n circular apertures are calculated, (because the equation for the surface representing the circular aperture is well-known, it is omitted here), and it is decided whether or not the respective intersection points are within the interiors of respective circular apertures.

When all the intersection points are interior to the circular apertures, the point $p_1$ is determined to be interior to the exit beam. Similarly, calculations are performed for determining equations representing the straight line joining $p_0$ and $p_2$, the straight line joining $p_0$ and $p_3$, etc. and, finally, a calculation is similarly performed for the straight line joining the point $p_0$ and the point $p_6$. If each of the points from point $p_1$ to point $p_6$ is interior to the exit beam, it is determined that the exit beam covers the rangefinder pupil. However, if even one point is determined to be outside the exit beam, it is decided that the vignetting phenomenon is occurring.

When the CPU 12 determines that the exit beam is not covering the rangefinder pupils 42a' and 42b', it is decided that focus detection by the focus detection device 36 is impossible, focus detection is not performed, and the display device 16 displays to that effect.

Although an example of the shape of the rangefinder pupil has been described as shown in FIG. 5, the rangefinder pupil may have complicated shapes, and by increasing the number of points representing the rangefinder pupil, the calculation method may be performed in the same manner described above.

FIG. 7 is a cross-sectional view of light paths corresponding to imaging beams in a wide angle lens. A method for defining a circular aperture is described with respect to FIG. 7. As seen in FIG. 7, a wide angle lens 62, which may be used as the interchangeable lens 30, includes five lens blocks 1G–5G, a stop aperture 64, and a fixed circular aperture 66. The image of the stop aperture 64 formed by the lens blocks 3G, 4G, 5G, seen to the right of the stop aperture 64, is the exit pupil.

As shown in FIG. 7, the exit beam is not limited by the stop aperture to image each image height. Instead, the lower side of the exit beam is limited by the fixed circular aperture 66, and the upper side of the exit beam is limited by the edge of lens block 4G. Therefore, when the stop aperture 64 is open, the exit beam is generally limited at positions outside the stop aperture 64. Accordingly, when the stop aperture 64 is open, the exit beam cannot be represented only by the data describing the exit pupil.

As described above, the exit pupil is an image of the stop aperture 64 formed by the lens blocks 3G, 4G, 5G. In the same manner, the image of the edge of the lens block 4G is formed by the lens block 5G. This image, because it is circular, is called circular image 1'. Of course, the circular image 1' can also be simply calculated if formed at a position separated to some extent from the image plane. Similarly, the image of the fixed circular aperture 66 by the lens blocks 2G, 3G, 4G and 5G is termed circular image 2'. According to this method of definition, it is evident that the exit beam at each image height is limited by means of the two circular images, circular image 1' and circular image 2'. Circular image 1' corresponds to the circular aperture 1 of FIG. 2, and circular image 2' corresponds to the circular aperture 2 of FIG. 2. Of course, because there are the effects of aberration and the like, the circular image 1' and the circular image 2' are not the unchanged circular apertures, and suitable corrections are added.

Figure 8:
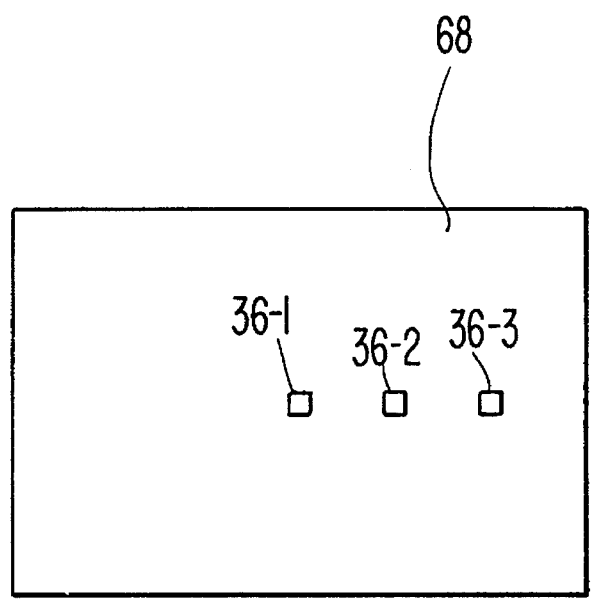
FIG. 8 illustrates a camera having plural focus detection devices in accordance with the preferred embodiments of the present invention.

FIG. 8 illustrates a photographic image plane 68 having plural focus detection devices 36-1, 36-2, 36-3 in accordance with the preferred embodiments of the present invention. A camera having plural focus detection devices, as shown in FIG. 8, incorporates each of the features illustrated and described with respect to FIG. 1, and duplicate descriptions of these features are, therefore, omitted.

As seen in FIG. 8, the camera has plural focus detection devices 36-j (in this example, j=3) provided in the camera body 10. The detection positions of the three focus detection devices 36-1, 36-2, and 36-3 in the photographic image plane 68 are as shown in FIG. 8. The focus detection device 36-1 is located at the image plane center, focus detection device 36-3 is located at a somewhat high image height position, and focus detection device 36-2 is located halfway between focus detection devices 36-1 and 36-3. Further, the left-hand side of the photographic image plane 68, may include focus detection devices corresponding to the focus detection devices 36-2 and 36-3. However, because the description in relation to image height is similar, these focus detection devices are omitted from the drawing.

The camera body memory 14 stores positions and shapes of the rangefinder pupils of the respective focus detection devices 36-j, and the data corresponding to rangefinder image point. Specifically, the position coordinates for a total of seven points, $p_0$-1 through $p_6$-1, are stored as the position coordinates for focus detection device 36-1. Similarly, seven position coordinates, $p_o$-2 through $p_6$-2, are stored as the position coordinates for focus detection device 36-2, and seven position coordinates, $p_o$-3 through $p_6$-3, are stored as the position coordinates for focus detection device 36-3.

The lens memory 32 in the interchangeable lens 30 installed on the camera body 20, stores characteristic data for each of the circular apertures, including (1) the number n of circular apertures, (2) the distance $d_i$, where i=1~n, of each circular aperture from the image plane, and (3) the radius $r_i$, where i=1~n, of each circular aperture.

Figure 9:
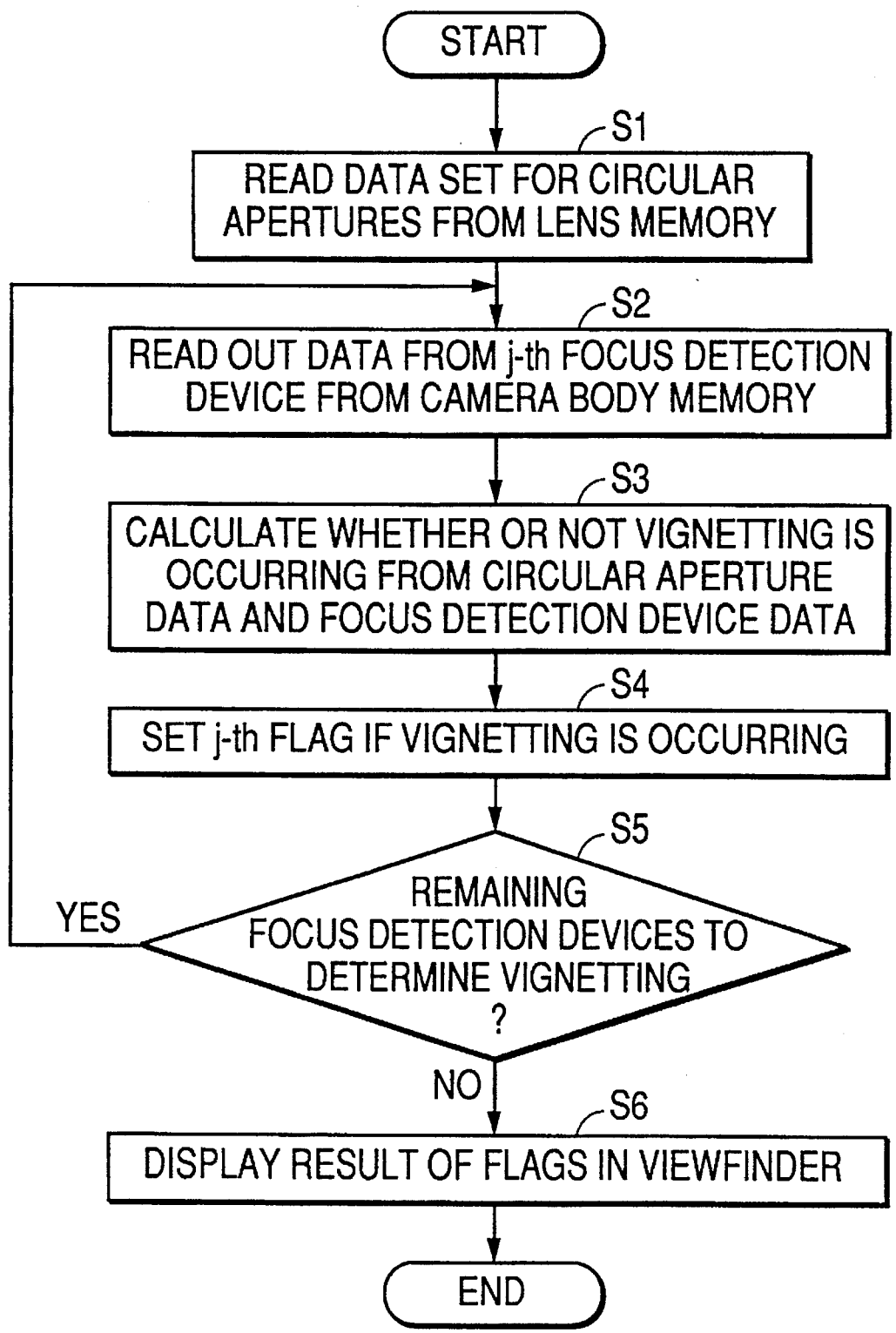
FIG. 9 is a flow chart showing a control routine for discriminating the vignetting phenomenon in accordance with the preferred embodiments of the present invention.

FIG. 9 is a flowchart showing an example of a control routine for discriminating the vignetting phenomenon and determining if focus detection is possible. In step S1, the set of data for the circular apertures stored in the lens memory 32 of interchangeable lens 30 is read into the CPU 12. Next, in step S2 the data relating to the j-th focus detection device 36-j is read by CPU 12 from the camera body memory 14. Continuing, in step S3 a calculation is performed using the data read in steps S1 and S2, as described above, and it is determined whether or not the rangefinder pupil of the focus detection device 36-1 is vignetting. When it is determined in step S3 that vignetting is occurring, a j-th flag is set in step S4.

In step S5, it is determined whether focus detection devices remain for which it must be determined if vignetting is occurring. When the determination step S5 is affirmative, control proceeds to step S2 where steps S2-S5 are repeated until a determination has been made for all focus detection devices. When step S5 is negative, control proceeds to step S6 and the result of the flags set in step S4 is displayed in the display device 16.

Figure 10:
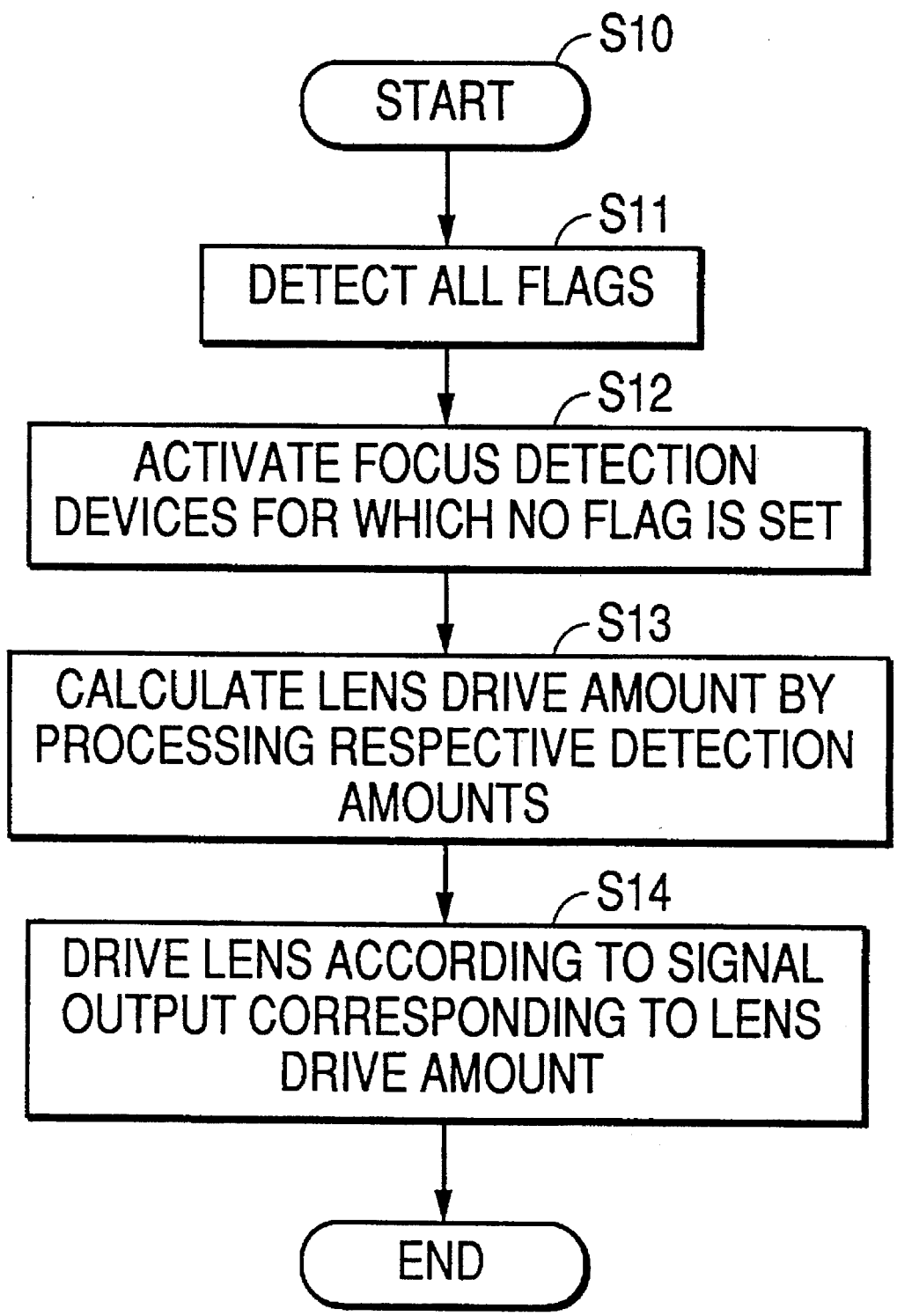
FIG. 10 is a flow chart showing an example of a first control routine for performing autofocus in a camera in accordance with the preferred embodiments of the present invention.

FIG. 10 is a flow chart showing an example of a first control routine for performing auto focus in a camera in accordance with the preferred embodiments of the present invention.

In step S11, all the flags set in step S4 of FIG. 9 are detected. Next, in step S12, the focus detection devices 36-j for which no flag was set are actuated. These devices correspond to focus detection devices for which no vignetting was detected. Continuing, in step S13 the CPU 12 processes respective focus detection results, for example, by averaging or the like, and calculates an amount of lens drive. In step S14, a signal is output to the drive device 18 corresponding to the calculated drive amount, and the photographic lens 32 is driven to a focused state.

Figure 11:
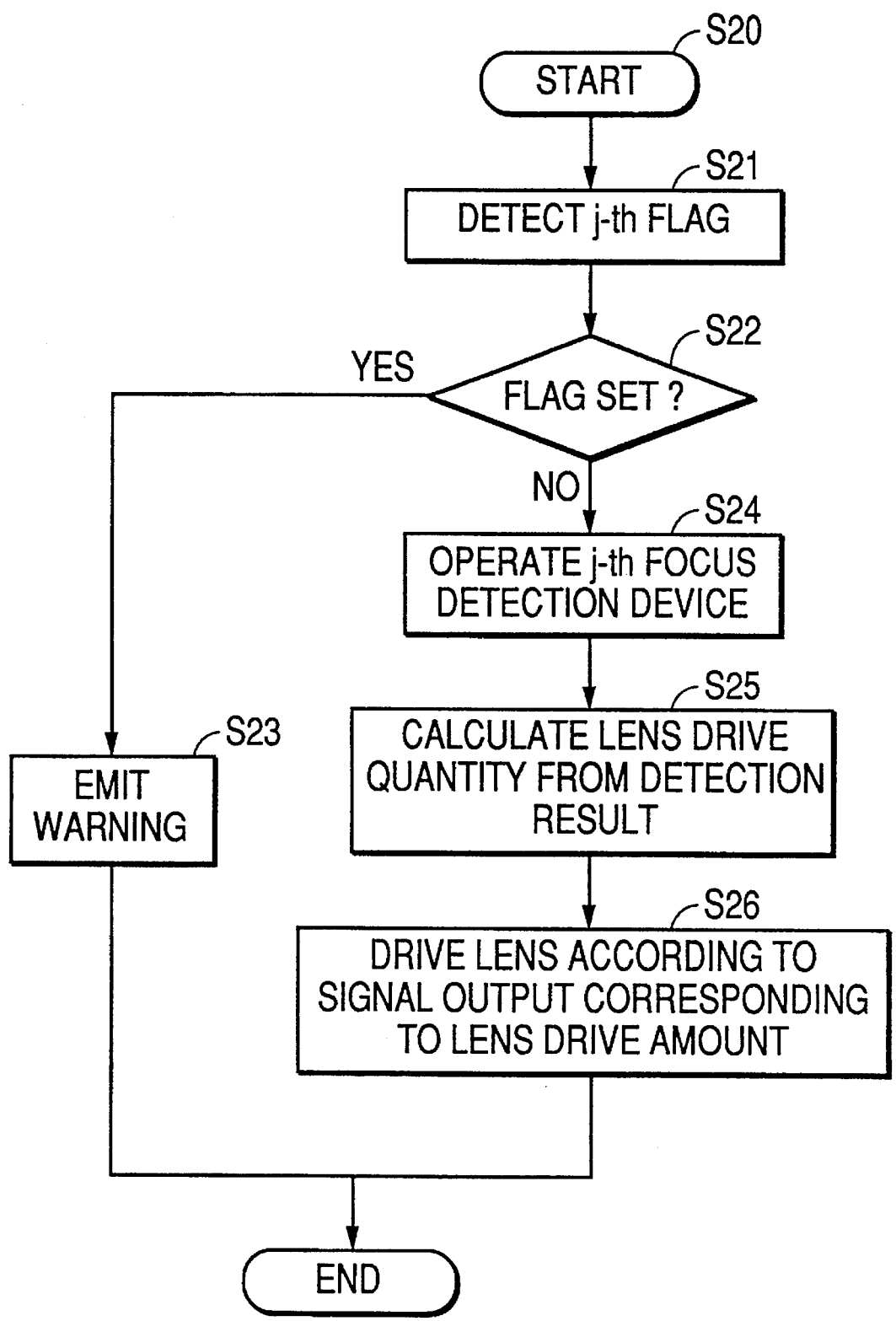
FIG. 11 is a flow chart showing an example of a second control routine for performing autofocus in a camera in accordance with the preferred embodiments of the present invention.

FIG. 11 is a flow chart showing an example of a control routine for performing autofocus in a camera which is executed in a situation in which a photographer selects the j-th focus detection device 36-j.

First, in step S21 the j-th flag is detected. Next, in step S22, it is determined whether the j-th flag is set. When the determination in step S22 is affirmative, control proceeds to step S23 where the display 16, a buzzer, or the like emits a warning when the j-th flag is set. When it is determined in step S22 that the j-th flag is not set, control proceeds to step S24 and the j-th focus detection device 36-j is operated. Proceeding to step S25, a lens drive quantity is calculated by means of the detection result determined in step S25. Continuing in step S26, a signal corresponding to a lens drive amount is output to the lens drive device 18, which drives the photographic lens 34.

Various modifications or changes to the above-described preferred embodiments are possible. For example, the interchangeable lens has been described in terms of a single focus lens. However, the interchangeable lens may also be a zoom lens. Since the focal length of a zoom lens can vary continuously, the optical state of the zoom lens changes, but the position of the image surface does not change. Since the optical state of the zoom lens can change, and because its exit beam can also change, it is handled as described below.

Generally, the optical state of a zoom lens continuously changes. By dividing the focus detection regions into portions (referred to below as "positions") and making the division fine (so that there are many portions), the optical properties come to be regarded as approximately equal. The exit beam is included in one position.

Considered in the above manner, a zoom lens can be regarded as a collection of single focus lenses corresponding to the number of positions. Because, as described above, one set of circular aperture data is necessary for one single focus lens, in a zoom lens, sets of data for the circular apertures are stored corresponding to the number of positions.

Specifically, when a zoom type of interchangeable lens 30 is installed on the camera body 10, in the case in which the positions change due to zooming, the interchangeable lens 30 sends signals indicating the changed positions to the CPU 12 of the camera body 10. The CPU 12 receives these signals and reads out from the lens memory 32 of the interchangeable lens 30 the set of circular aperture data corresponding to the present positions.

Furthermore, the present invention is not limited to single focus lenses and zoom lenses. The interchangeable lens 30 may also be a rear focus lens, whose optical state changes due to focusing and the exit beam changes accordingly. The rear focus lens, similar to a zoom lens, can be dealt with by establishing plural positions.

Moreover, the data stored in the interchangeable lens and representing the exit beams can be used not only in the focus detection devices but also rangefinding devices.

Although the preferred embodiments of the invention have been shown and described, it will be appreciated by those skilled in the art that changes may be made in these embodiments, without departing from the principles and the spirit of the invention, the scope of which is defined in the appended claims and their equivalents.

What is claimed is:

1. A device for determining whether focus detection may be accurately performed in a camera, comprising:

an interchangeable lens mounted on the camera which includes at least one circular aperture;

a focus detection device located in the camera which performs focus detection for a focus detection region, and which outputs a focal point position;

a lens memory which stores data representing an exit beam for an optional image height;

a camera memory which stores data representing characteristics of the focus detection device; and a decision unit, coupled to the lens memory and to the camera memory, to determine whether focus detection may be accurately performed based upon the data stored in the lens memory and based upon the characteristic data stored in the camera memory.

2. The device, as recited in claim 1, wherein the data stored in the lens memory representing the exit beam for an optional image height correspond to a position and a size of the at least one circular aperture.

3. The device, as recited in claim 2, wherein the focus detection device includes a rangefinder optical device, and wherein the characteristic data stored in the camera memory correspond to the position and shape of an entrance pupil of the rangefinder optical device.

4. The device, as recited in claim 1, further comprising a control unit, coupled to the decision unit and the interchangeable lens, which is responsive to the determination by the decision unit in order to control focusing of the interchangeable lens.

5. The device, as recited in claim 1, further comprising a display unit, coupled to the decision unit, to display a result of the decision unit.

6. The device, as recited in claim 1, further comprising a warning device to emit a warning when the decision unit determines that focus detection may not be accurately performed.

7. A device as recited in claim 1, wherein the interchangeable lens includes plural circular apertures and the data stored in the lens memory representing an exit beam for an optional image height corresponds to positions and sizes of respective circular apertures.

8. A device as recited in claim 7, wherein the data stored in the camera memory includes data representing position coordinates of a rangefinder pupil and position coordinates of a rangefinder image point.

9. A device for deciding whether focus detection may be accurately performed in a camera, comprising:

an interchangeable lens including at least one circular aperture;

a plurality of focus detection devices located in the camera which perform focus detection for respective focus detection regions within a photographic image plane, and which output respective focal point positions;

a lens memory which stores data representing an exit beam for an optional image height;

a camera memory located in the camera which stores data representing characteristics of the plurality of focus detection devices;

a decision unit, coupled to the lens memory and to the camera memory, to determine whether focus detection may be accurately performed for each respective focus detection device based upon the data stored in the lens memory and based upon the data stored in the camera memory.

10. The device, as recited in claim 9, wherein the data representing the exit beam for an optional image height correspond to a position and size of the at least one circular aperture.

11. The device, as recited in claim 9, further comprising a control unit, coupled to the decision unit and the interchangeable lens, which controls the focusing of the interchangeable lens based upon the determination of the decision unit.

12. An apparatus for determining whether focus detection may be accurately performed in a camera, comprising:

an interchangeable lens including at least one circular aperture;

a lens memory to store data representing an exit beam for an optional image height, the data representing the exit beam including a position and size of the at least one circular aperture;

a camera memory to store data representing characteristics of a focus detection device; and a decision unit, coupled to the lens memory and the camera memory, to determine whether focus detection may be accurately performed based upon the data stored in the lens memory and the data stored in the camera memory.

13. A device for determining whether focus detection may be accurately performed in a camera, comprising:

an interchangeable lens mounted on the camera which includes at least one circular aperture;

a focus detection device located in the camera to perform focus detection for a focus detection region and to output a focal point position, the focus detection device including a rangefinder optical device;

a lens memory to store data representing an exit beam for an optional image height, the data stored in the lens memory including data representing a position and a size of the at least one circular aperture;

a camera memory to store data representing characteristics of the focus detection device, the characteristic data stored in the camera memory including data representing the position and shape of an entrance pupil of the rangefinder optical device; and a decision unit, coupled to the lens memory and to the camera memory, to determine whether focus detection may be accurately performed based upon the data stored in the lens memory and based upon the characteristic data stored in the camera memory.

14. A device as recited in claim 13, further comprising a control unit, coupled to the decision unit and to the interchangeable lens, which is responsive to the determination by the decision unit to control focusing of the interchangeable lens.

15. A device as recited in claim 13, further comprising a display unit, coupled to the decision unit, to display a result of the decision unit.

16. A device as recited in claim 13, further comprising a warning device to emit a warning when the decision unit determines that focus detection may not be accurately performed.

17. A device for deciding whether focus detection may be accurately performed in a camera, comprising:

an interchangeable lens including at least one circular aperture;

a plurality of focus detection devices located in the camera which perform focus detection for respective focus detection regions within a photographic image plane, and which output respective focal point positions;

a lens memory to store data representing an exit beam for an optional image height, the data representing the exit beam for an optional image height including a position and a size of the at least one circular aperture;

a camera memory located in the camera which stores data representing characteristics of the plurality of focus detection devices; and a decision unit, coupled to the lens memory and to the camera memory, to determine whether focus detection may be accurately performed for each respective focus detection device based upon the data stored in the lens memory and based upon the data stored in the camera memory.

18. A device as recited in claim 17, wherein the interchangeable lens includes plural circular apertures and the data stored in the lens memory representing an exit beam for an optional image height corresponds to positions and sizes of respective circular apertures.

19. A device as recited in claim 18, wherein the data stored in the camera memory representing characteristics of the plurality of focus detection devices includes data representing position coordinates of a rangefinder pupil and position coordinates of a rangefinder image point.

* * * * *